United States Patent
Shi et al.

(10) Patent No.: US 8,889,985 B2
(45) Date of Patent: Nov. 18, 2014

(54) PROTECTIVE HOUSING FOR ELECTRONIC DEVICE

(75) Inventors: Fa-Guang Shi, Shenzhen (CN); Ming-Fu Luo, Shenzhen (CN); Jian-Zhou Zhao, Shenzhen (CN); Yan Liang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 124 days.

(21) Appl. No.: 13/447,426

(22) Filed: Apr. 16, 2012

(65) Prior Publication Data
US 2013/0048333 A1  Feb. 28, 2013

(30) Foreign Application Priority Data
Aug. 29, 2011  (CN) .......................... 2011 1 0250702

(51) Int. Cl.
| | |
|---|---|
| H01J 5/00 | (2006.01) |
| E05C 17/56 | (2006.01) |
| H01H 47/00 | (2006.01) |
| H05K 5/00 | (2006.01) |
| H04M 1/02 | (2006.01) |
| H04M 1/04 | (2006.01) |
| G06F 1/16 | (2006.01) |

(52) U.S. Cl.
CPC ...... *G06F 1/1626* (2013.01); *G06F 2200/1634* (2013.01); *H04M 1/0216* (2013.01); *H04M 1/04* (2013.01)

USPC ........... 174/50; 292/251.5; 361/142; 361/755

(58) Field of Classification Search
USPC ............ 174/50; 292/251.5; 361/142, 679.02, 361/755
See application file for complete search history.

(56) References Cited

U.S. PATENT DOCUMENTS

| | | | |
|---|---|---|---|
| 6,653,919 B2 * | 11/2003 | Shih-Chung et al. ......... | 335/207 |
| 6,929,291 B2 * | 8/2005 | Chen .......................... | 292/251.5 |
| 7,234,739 B2 * | 6/2007 | Saitoh et al. ............... | 292/251.5 |
| 7,852,621 B2 * | 12/2010 | Lin et al. .................. | 361/679.02 |
| 2005/0167992 A1 * | 8/2005 | Lo et al. ..................... | 292/251.5 |
| 2006/0006674 A1 * | 1/2006 | Kang et al. ................. | 292/251.5 |
| 2007/0138806 A1 * | 6/2007 | Ligtenberg et al. ........ | 292/251.5 |
| 2008/0061565 A1 * | 3/2008 | Lee et al. .................... | 292/251.5 |
| 2008/0309098 A1 * | 12/2008 | Hsu et al. ................... | 292/251.5 |
| 2011/0012846 A1 * | 1/2011 | Zhu et al. ..................... | 345/173 |

* cited by examiner

*Primary Examiner* — Timothy Thompson
*Assistant Examiner* — Sherman Ng
(74) *Attorney, Agent, or Firm* — Novak Druce Connolly Bove + Quigg LLP

(57) ABSTRACT

A protective housing for an electronic device includes a main body, a protective cover, and a connecting mechanism. The protective cover is rotatably and detachably mounted to the main body by the connecting mechanism. The connecting mechanism includes a first magnetic assembly, a second magnetic assembly, and a mounting base. The first magnetic assembly is assembled within the main body, the second magnetic assembly is assembled within the mounting base. The mounting base is pivotally hinged to the protective cover, and the first magnetic assembly and the second magnetic assembly attract each other, thereby connecting the main body and the protective cover together.

11 Claims, 3 Drawing Sheets

PROTECTIVE HOUSING FOR ELECTRONIC DEVICE

BACKGROUND

1. Technical Field

The present disclosure generally relates to housing structures, and particularly to a protective housing for an electronic device.

2. Description of Related Art

With the development of electronic technologies, portable electronic devices, such as mobile phones, media players, and personal digital assistants (PDAS), for example, are widely used. In order to protect the electronic device from being scratched or damaged, various types of protective housings or protective sleeves are used to enclose and protect the electronic devices. A commonly used protective housing generally includes a frame, a hinge structure and a protective cover rotatably hinged to the frame via the hinge structure; the frame and the protective cover cooperatively define a receiving space for enclosing the whole electronic device. However, the existing protective housing has a complex structure, and the protective cover is also difficult to detach from the frame during use.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
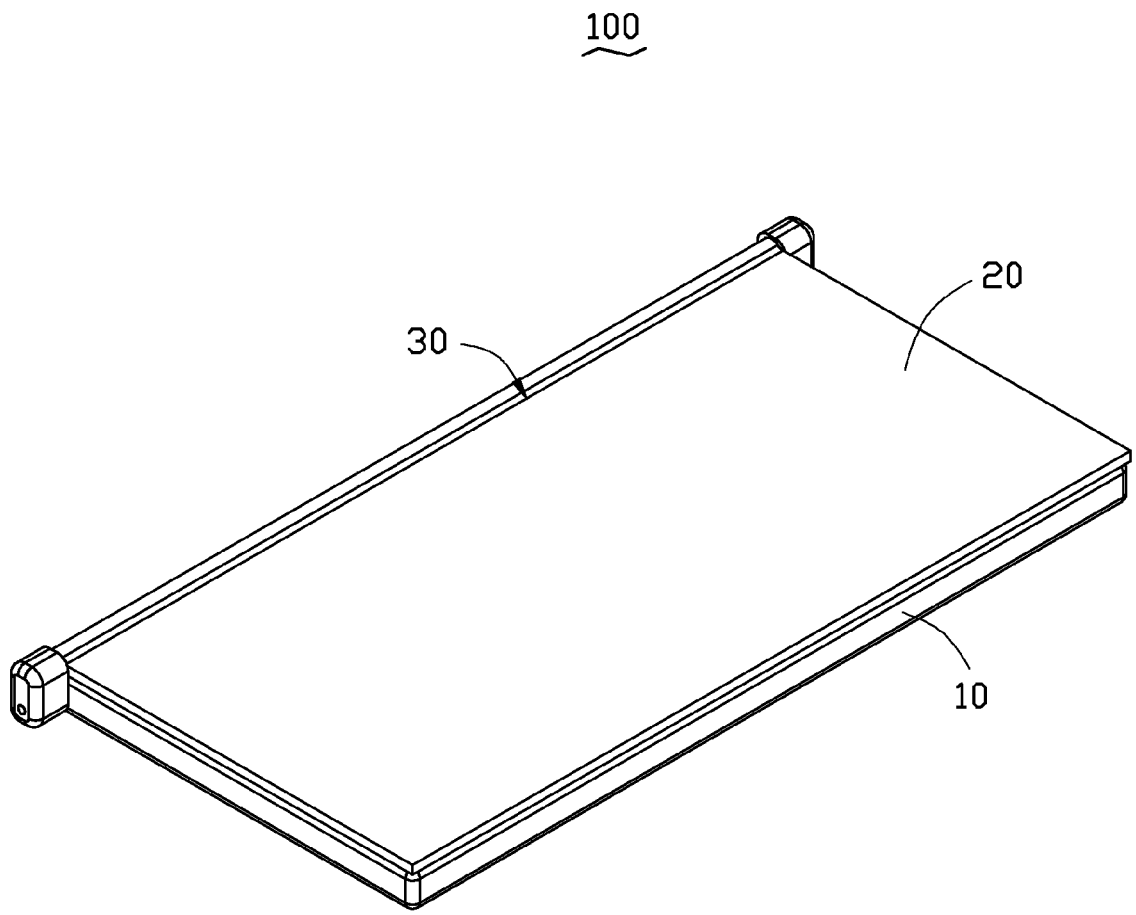
FIG. 1 shows an isometric view of a first embodiment of a protective housing for an electronic device.

FIG. 1, shows a first embodiment of a protective housing 100 for an electronic device (not shown). The protective housing 100 includes a main body 10, a protective cover 20 and a connecting mechanism 30. The protective cover 20 is detachably mounted to the main body 10 via the connecting mechanism 30. The main body 10 and the protective cover 20 cooperatively define a receiving space (not shown) for receiving the electronic device. The electronic device may be a mobile phone, a media player, or a personal digital assistant (PDA), for example.

Figure 2:
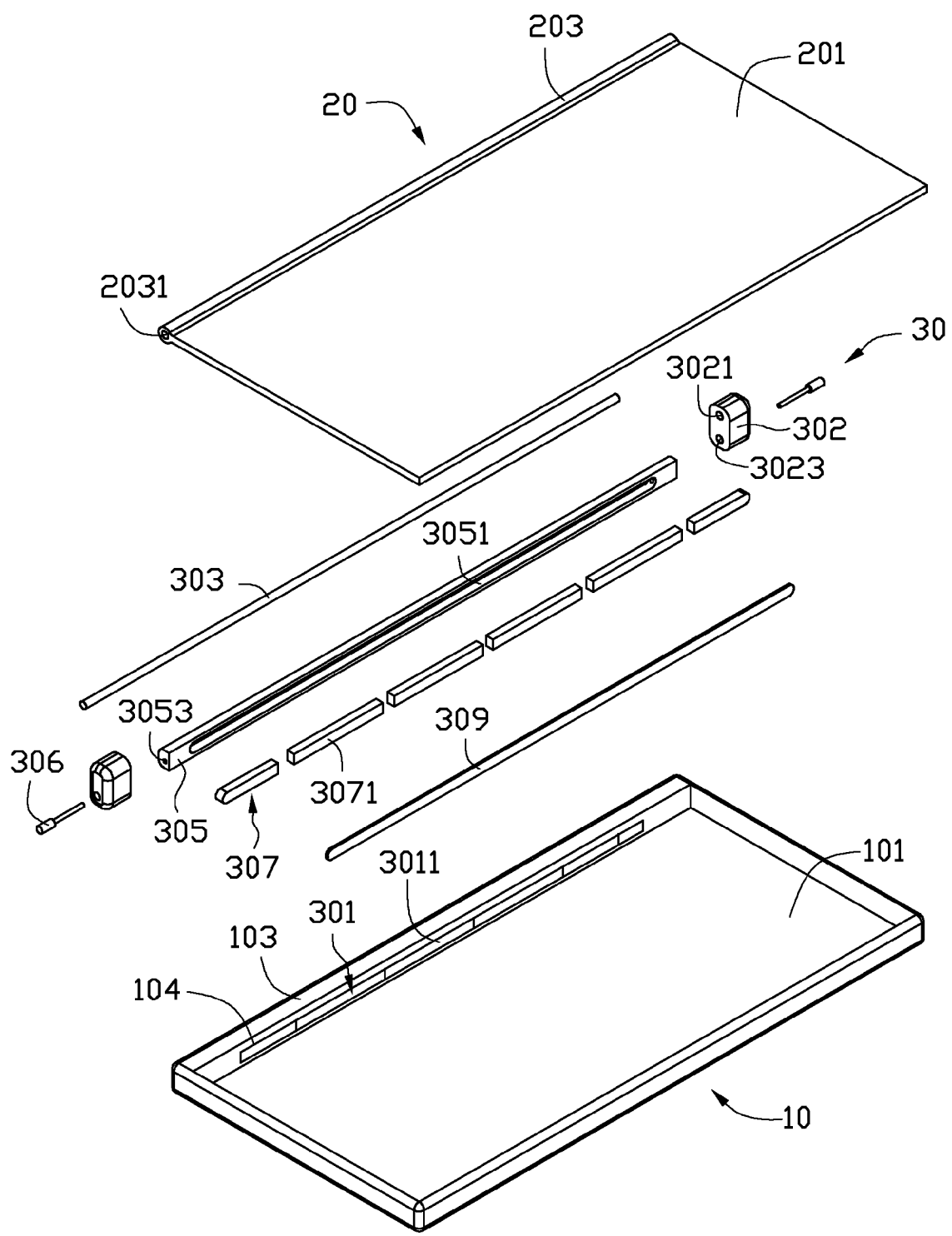
FIG. 2 shows an exploded, isometric view of the protective housing of FIG. 1.

FIG. 2, shows the main body 10 is substantially rectangular, and defines a substantially rectangular receiving chamber 101, and further includes four side walls 103 surrounding the receiving chamber 101. One side wall 103 defines a bar-shaped receiving slot 104 communicating with the receiving chamber 101.

The protective cover 20 includes a cover plate 201 and a connecting portion 203 formed on one side of the cover plate 201. The cover plate 201 is substantially rectangular in the illustrated embodiment, and has a shape substantially the same as the main body 10, for covering the receiving chamber 101 of the main body 10. The connecting portion 203 longitudinally thereof defines a connecting hole 2031.

The connecting mechanism 30 includes a first magnetic assembly 301, two connecting blocks 302, a pivotal shaft 303, a mounting base 305, two rotary shafts 306, a second magnetic assembly 307, and a fixing plate 309.

The first magnetic assembly 301 is assembled within the receiving slot 104 of the main body 10, and includes at least two bar-shaped magnet bodies 3011. In the illustrated embodiment, the first magnetic assembly 301 includes six bar-shaped magnet bodies 3011. The six bar-shaped magnet bodies 3011 are all received within the receiving slot 104 of the main body 10 and connect to each other one by one in that order.

The two connecting blocks 302 are assembled to two ends of the mounting base 305 via the two rotary shafts 306. Each connecting block 302 defines a pivotal hole 3021 and a mounting hole 3023 parallel to the pivotal hole 3021. In the illustrated embodiment, the pivotal hole 3021 is a blind hole, and the mounting hole 3023 is a through hole.

The mounting base 305 is a substantially bar-shaped rod. One side of the mounting base 305 defines a bar-shaped mounting slot 3051. Two ends of the mounting base 305 define an assembling hole 3053, respectively.

The second magnetic assembly 307 is assembled within the mounting slot 3051 of the mounting base 305 corresponding to the first magnetic assembly 301. The second magnetic assembly 307 includes at least two bar-shaped magnetic bodies 3071. In the illustrated embodiment, the second magnetic assembly 307 includes six bar-shaped magnet bodies 3071. The six bar-shaped magnet bodies 3071 are all received within the mounting slot 3051 of the mounting base 305 and attracted to each other one by one in that order.

The fixing plate 309 is a substantially bar-shaped sheet, and is fixed to the mounting base 305 for covering the mounting slot 3051.

When assembling the protective housing 100, the first magnetic assembly 301 is assembled into the receiving slot 104 of the main body 10, first. The pivotal shaft 303 passes through the connecting hole 2031, and two ends of the pivotal shaft 303 are received into the pivotal holes 3021 of the two connecting blocks 302, respectively. The mounting base 305 is mounted and sandwiched between the two connecting blocks 302 via the two rotary shafts 306. The two rotary shafts 306 respectively pass through the mounting holes 3023 of the two connecting blocks 302, and are further assembled into the two assembling holes 3053 of two ends of the mounting base 305. After that, the second magnetic assembly 307 is assembled into the mounting slot 3051 of the mounting base 305, and the fixing plate 309 is then fixed to the mounting base 305 for covering the second magnetic assembly 307 within the mounting slot 3051. Finally, the assembled protective cover 20 together with the connecting mechanism 30 is attached to the main body 10, the protective cover 20 covers the receiving chamber 101 of the main body 10, and the second magnetic assembly 307 of the connecting mechanism 30 attracts the corresponding first magnetic assembly 301, such that, the protective cover 20 is rotatably and detachably assembled to the main body 10 via the connecting mechanism 30.

In use, the electronic device is assembled into and received within the receiving chamber 101 of the main body 10, the protective cover 20 is rotatably assembled with the main body 10 for covering the electronic device, in an unused state. The protective cover 20 rotates relative to the main body 10 along the pivotal shaft 303. The protective cover 20 together with the connecting mechanism 30 detaches from the main body 10 quickly, when there is a need to use the protective cover 20 for other purpose, and is also capable of being attached to the main body 10 quickly by means of the magnetic attracting force between the first magnetic assembly 301 and the second magnetic assembly 307.

Figure 3:
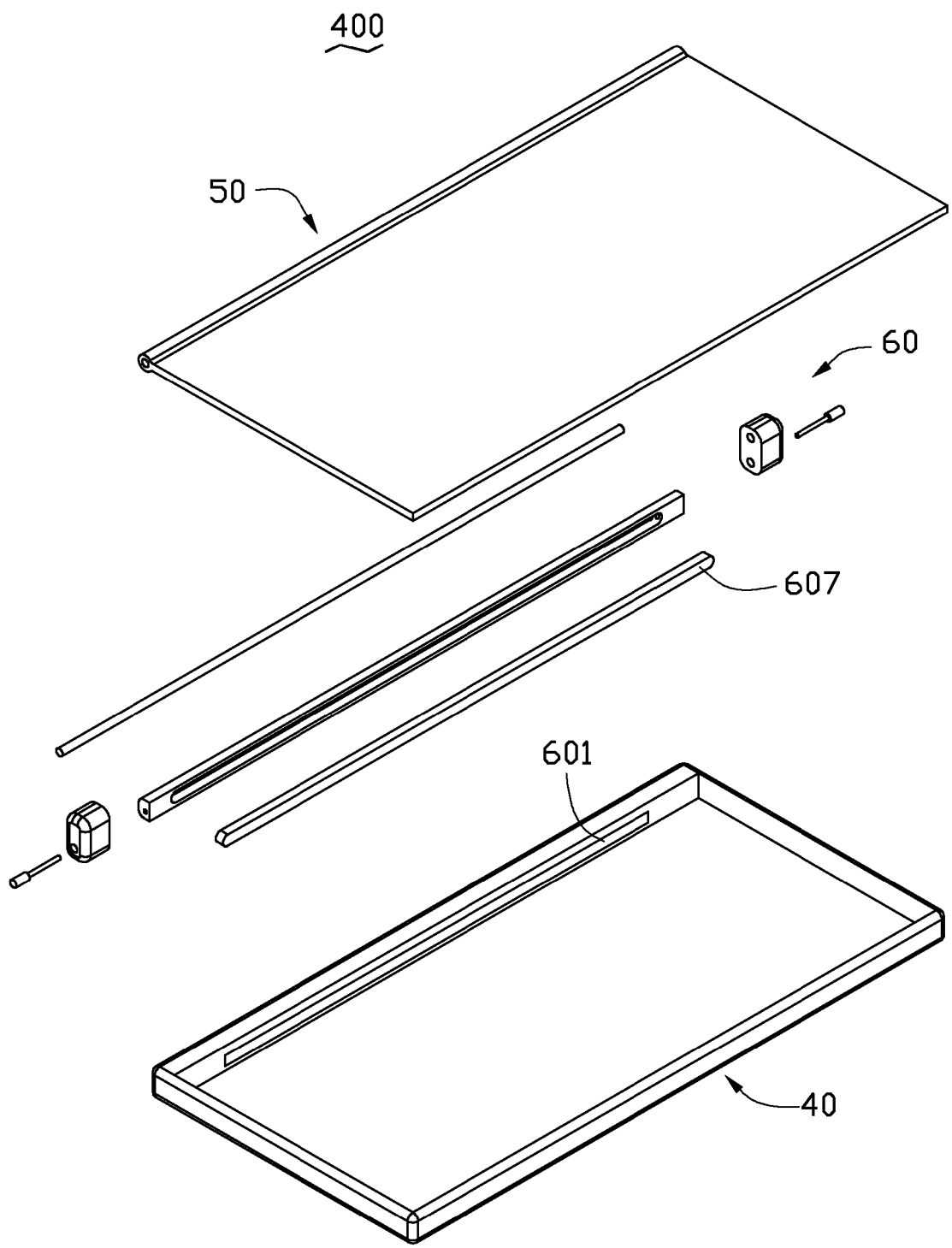
FIG. 3 shows an exploded, isometric view of a second embodiment of the protective housing for an electronic device.

FIG. 3, shows a second embodiment of the protective housing 400 for the electronic device. The protective housing 400 has a similar structure as the protective housing 100. The protective housing 400 includes a main body 40, a protective cover 50 and a connecting mechanism 60. The connecting mechanism 60 includes a first magnetic member 601 and a second magnetic member 607. Both of the first magnetic member 601 and the second magnetic member 607 are rubber magnets.

In one embodiment, the first magnetic assembly 301 may also be assembled within an electronic device, such that the protective housing 100 merely includes the protective cover 20 and the connecting mechanism 30. In other words, the main body 10 itself can be an electronic device.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A protective housing for an electronic device, the protective housing comprising:
    a main body;
    a connecting mechanism comprising:
        a first magnetic assembly assembled within the main body,
        a mounting base,
        two rotary shafts,
        two connecting blocks assembled to two ends of the mounting base via the two rotary shafts,
        a pivotal shaft, and
        a second magnetic assembly assembled within the mounting base; and
    a protective cover comprising a cover plate and a connecting portion formed on one side of the cover plate, the connecting portion defining a connecting hole longitudinally thereof,
    wherein the pivotal shaft passes through the connecting hole of the connecting portion of the protective cover, and two ends of the pivotal shaft are respectively received into the two connecting blocks, the protective cover is pivotally and rotatably connected to the mounting base, and the first magnetic assembly and the second magnetic assembly are capable of attracting or detaching from each other, thereby the protective cover being rotatably and detachably mounted to the main body.

2. The protective housing of claim 1, wherein the first magnetic assembly and the second magnetic assembly each comprises at least two magnet bodies, respectively.

3. The protective housing of claim 1, wherein the first magnetic and second magnetic assemblies are rubber magnets.

4. The protective housing of claim 1, wherein the main body defines a receiving chamber and comprises one side wall, the side wall defines a receiving slot communicating with the receiving chamber; the first magnetic assembly is assembled within the receiving slot of the main body.

5. The protective housing of claim 4, wherein the mounting base defines a mounting slot facing toward the corresponding side wall of the main body, the second magnetic assembly is assembled within the mounting slot of the mounting base and attracts with the first magnetic assembly.

6. The protective housing of claim 1, wherein the connecting mechanism further comprises a fixing plate fixed to the mounting base for covering the mounting slot.

7. A protective housing for an electronic device, comprising:
    a connecting mechanism; and
    a protective cover rotatably and detachably mounted to the electronic device via the connecting mechanism, the protective cover comprising a cover plate and a connecting portion formed on one side of the cover plate, the connecting portion defining a connecting hole longitudinally thereof;
    wherein the connecting mechanism comprises a first magnetic assembly, a second magnetic assembly, a mounting base, two connecting blocks, a pivotal shaft, and two rotary shafts, the two connecting blocks are assembled to two ends of the mounting base via the two rotary shafts; the pivotal shaft passes through the connecting hole of the connecting portion of the protective cover, and two ends of the pivotal shaft are respectively hinged to the two connecting blocks, the first magnetic assembly is assembled within the electronic device, the second magnetic assembly is assembled within the mounting base; the mounting base is pivotally hinged to the protective cover, the first magnetic assembly and the second magnetic assembly attract each other, thereby connecting the protective cover to the electronic device.

8. The protective housing of claim 7, wherein the first magnetic assembly and the second magnetic assembly are rubber magnets.

9. The protective housing of claim 8, wherein the electronic device defines a receiving slot in one side wall thereof; the first magnetic assembly is assembled within the receiving slot of the electronic device.

10. The protective housing of claim 9, wherein the mounting base defines a mounting slot facing toward the corresponding side wall of the electronic device, the second magnetic assembly is assembled within the mounting slot of the mounting base and attracts with the first magnetic assembly.

11. The protective housing of claim 7, wherein the connecting mechanism further comprises a fixing plate fixed to the mounting base for covering the mounting slot.

\* \* \* \* \*